United States Patent [19]
Chalco et al.

[11] Patent Number: 5,154,022
[45] Date of Patent: Oct. 13, 1992

[54] HIGH PRECISION MICROMACHINING OF VERY FINE FEATURES

[75] Inventors: Pedro A. Chalco, Yorktown Heights, N.Y.; Harry D. Euler, Brookfield, Conn.; Robert L. Rohr, Scarsdale, N.Y.

[73] Assignee: International Business Machines Corporation, Armonk, N.Y.

[21] Appl. No.: 718,733

[22] Filed: Jun. 21, 1991

[51] Int. Cl.⁵ .................................................. B24B 1/00
[52] U.S. Cl. ...................................... 51/281 R; 51/317; 51/328
[58] Field of Search ................ 125/16.01; 51/317, 281, 51/328

[56] References Cited

U.S. PATENT DOCUMENTS

| | | | |
|---|---|---|---|
| 2,385,287 | 9/1945 | Le Van | 51/28 BR X |
| 3,435,815 | 4/1969 | Forcier | 125/16.01 |
| 3,628,294 | 12/1971 | Sattler et al. | 51/283 R |
| 3,674,004 | 7/1972 | Grandia et al. | 125/16.01 |
| 3,834,083 | 9/1974 | Hoshi et al. | 51/57 |
| 4,596,640 | 6/1986 | Inoue | 51/62 X |
| 4,646,710 | 3/1987 | Schmid et al. | 51/65 X |
| 4,702,138 | 10/1987 | Hattori et al. | 125/16.01 X |
| 4,727,852 | 3/1988 | Schmid et al. | 51/65 X |

Primary Examiner—James G. Smith
Attorney, Agent, or Firm—Louis J. Percello

[57] ABSTRACT

A method and apparatus is disclosed for machining very fine, smooth cuts and grooves on minute surfaces such as single point bonding tips. The invention accurately aligns the axis of a reciprocating cutting wire in the direction of reciprocating motion and permits precise positioning and repositioning of the cutting wire on a work surface. The apparatus allows an unobstructed view of the wire in proximity to the workpiece during the alignment, positioning, repositioning, and cutting operations.

21 Claims, 5 Drawing Sheets

HIGH PRECISION MICROMACHINING OF VERY FINE FEATURES

BACKGROUND OF THE INVENTION

1. Field of the Invention

This invention relates to machining fine, precision grooves or cuts in a workpiece. Specifically, it relates to using an abrading wire in reciprocal motion to machine smooth and narrow grooves with precise depths and locations on a workpiece.

One application of the invention relates to machining a pattern of precision grooves on metal tips used in single point and wire bonding.

2. Description of the Prior Art

The prior art has many methods and apparatus for minute machining of a workpiece, e.g, hole enlarging, cutting, dicing, and grinding.

U.S. Pat. No. 2,385,287 discloses a method and apparatus for opening or enlarging the holes drilled in jewel bearings of the type used in precision instruments. A reciprocally moving wire having different diameters in its single length, i.e. a step wire, is advanced through a hole in the jewel until the hole diameter increases to the desired size.

Abrasive particles or grit pre-bonded to continuous elongated tools such as wire-type or band-type blades have been used to cut workpieces. U.S. Pat. No. 4,596,640 discloses a 0.1 millimeter to 1 millimeter diameter tungsten wire, with diamond abrasive particles on its surface, reciprocally moving against a workpiece. Note that 0.1 millimeter is equivalent to approximately 4 mils.

U.S. Pat. Nos. 4,646,710 and 4,727,852 disclose some methods for cutting or subdividing semiconductor wafers. One wafering machine has a bladehead that reciprocally moves a multiplicity of taut wire cutting blades past a workpiece.

U.S. Pat. No. 3,435,815 describes a wafer dicer which subdivides a semiconductor wafer by drawing loops of fine wire across the surface of the wafer to abrade cuts into the wafer surface. The 3 mil to 10 mil diameter wire is continuously transferred from one reel to another in a single direction for a period of time greater than a few minutes. The wire can then be reversed and moved in the opposite direction. An abrasive slurry is fed on to the wire, drawn across the workpiece by the wire, and removed from the wire after the wire passes the workpiece.

U.S. Pat. No. 3,674,004 has a dicing machine that uses an unstressed blade to produce 2 mil cuts in a semiconductor wafer with little or no cutting damage. Cutting elements may have thicknesses of less than 2 mils to thicknesses of 10 to 15 mils. A dimensionally stable and precision cut groove in a cutting assembly holds the blade. The cutting assembly is mounted in a carriage. An alignment assembly has a translation stage moveable in a direction perpendicular to the cutter carriage motion and a rotatable stage mounted on the translation stage platform. A worm gear arrangement rotates the rotatable stage. The alignment assembly aligns the carriage and cutting assemblies relative to the workpiece with a cross hair alignment feature.

The prior art teaches grinding of semiconductor material. U.S. Pat. No. 3,628,294 uses separate grinding wires of progressively smaller diameter to grind out a bevelled cavity in the periphery of a disc of semiconductor material. U.S. Pat. No. 3,834,083 grinds a rounded chamfer on the edge of a workpiece, such as a semiconductor wafer. The workpiece is attached to a revolving chuck. A grinding head, having oblique resilient grinding members, extends beyond the edges of the wafer and presses against wafer the edge.

Statement of Problems With the Prior Art

The prior art does mention general machining, i.e., grinding, chamfering, boring, edge groove cutting (bevelling), cutting, and dicing workpieces. However, this art does not recognize or address many of the problems associated with micromachining. Certain of these problems relate to workpieces used as working surfaces. Other problems relate to all workpieces.

Some specific problems arise when micromachining working surfaces, i.e., surfaces which handle material or experience stress. These problems include workpiece quality control, fatigue cracking, and groove smoothness. The known prior art does not discuss working surfaces or recognize these problems.

Tips used in single point bounding are examples of micromachined working surfaces. Single point bonding tips typically are hard metal leads with a tip cross section on the order of 2 mils to 5 mils. Often there is a groove or a pattern of grooves machined on the tip. In operation, heat, vibration, and/or mechanical force is applied to the tip as it contacts a substrate. During the contact, the tip performs its specially designed function. These functions include shaping connections, soldering contacts, or bonding wire elements to the substrate.

Tips machined by methods in the prior art had quality control so poor that some were delivered with visual chips or cracks. Those with no initial cracks had very rough surfaces and did not work well. Rough surfaces tend to nick or crack wires handled by the tips. The bonds produced by rough tips are relatively weak.

The crude methods of the known art can not produce long lasting single point bonding tips that withstand repetitive shock stresses. Factors like large and rapid temperature changes, high frequency vibrations, and mechanical stresses cause crack failure in prior art single point bonding tip workpieces after 20 to 100 operations.

There is a need in single point bonding applications to have tip lifetimes of more than 100,000 operations. In the near future, applications will require 400 to 500 single point bonding operations per circuit device. Assuming approximately 10 devices per printed circuit board, each board will require on the order of 4000 to 5000 single point bonds. Tips having lifetimes of at least 100,000 operations can complete the bonding required on 20 to 25 boards without failing. This is an acceptable mean time between failure. Using present technology, 40 to 50 tips would fail to complete bonding operations on just one circuit board. With the prior art failure rate, applications for single point bonding technologies are substantially limited.

Roughly finished surfaces provide areas for crack initiation. Workpieces with rough working surfaces that undergo vibration or many mechanical and/or thermal stresses are prone to crack growth and fatigue failures. Aside from minimizing cutting damage, none of the known prior art recognizes the importance of the surface finish of machined workpieces. The prior art discloses no method to produce smooth finished grooves with widths less than 2 mils.

Other problems, unaddressed in the prior art, apply to both working and nonworking surfaces. These problems include: alignment of cutting means to produce narrower grooves, visual observation of the workpiece during alignment and cutting, precise repositioning of the cutting means, shaping grooves, handling fine cutting wire, or cutting precise tolerances.

The art has alignment limitations. For example, none of the prior art accurately aligns its cutting edge in the direction of cutting motion in order to assure a uniformly narrow cut width. The prior art can not machine cuts much smaller than 2 mils in width. No known prior art aligns a cutting means on workpiece surfaces as small as the point of a tip, e.g. on the order of 2 mils to 5 mils. (Although Electrical Discharge Machining, EDM, techniques can produce grooves on surfaces this small, these grooves have cracks, rough walls and quality too poor for use as working surfaces.)

The prior art does not permit easy observation of the workpiece during alignment or machining. Complicated machinery obstructs the workpiece view. Viewing the workpiece during alignment and machining would improve workpiece quality by insuring that grooves have the proper placement, shape, and depth.

The art also fails to recognize the need to precisely reposition the cutting edge. It does not disclose how to produce a groove pattern by repositioning and realigning the cutting means to machining grooves in very precise and close proximity (say within 1 mil) with respect to one another.

There is no teaching in the prior art about machining very fine grooves with exact and uniform depths and widths or about machining such grooves with very fine cutting wires.

The alignment methods and cutting means disclosed in the prior art limit the tolerances of workpiece cuts. The prior art can not position, within a fraction of a mil tolerance, a second cut center line within 10 mils of and parallel to a first cut center line on a workpiece such as a silicon wafer (non-working surface).

OBJECTIVES

One objective of this invention is to provide a simple method and apparatus for micromachining a minute workpiece surface with narrower grooves or cuts than possible by using the prior art.

Another objective of this invention is to provide a method and apparatus for aligning and using a finer cutting means than found in the prior art.

Still another objective of this invention is an improved micromachining method and apparatus to precisely position and reposition a cutting means on a minute surface to machine multi-groove patterns.

A further objective of this invention is to provide a method and apparatus to improve micromachined workpiece quality by machining much smoother groove surfaces.

Moreover an objective of this invention is to provide a method and apparatus to produce high quality single point bonding tips durable enough to last for hundreds of thousands more operations than prior art tips.

SUMMARY OF THE INVENTION

The present invention comprises a method and apparatus for positioning and machining precision, narrow, and smooth grooves on a minute workpiece surface. These surface dimensions are on the order of the cross section of a human hair.

The apparatus, which reciprocally moves a cutting wire coated with an abrasive slurry in relation to a workpiece, has features that align the wire axis in the direction of motion, position the wire with respect to the workpiece, and adjust wire machining pressure on the workpiece. To facilitate alignment, positioning, and machining, the efficient apparatus design allows an unobstructed view of the workpiece surface in proximity with the cutting wire. A wire holding assembly holds the wire in spring tension to maintain wire cutting pressure on the workpiece and prolong wire life. An adjustment determines the amount of pressure contact the wire has with the workpiece.

The method of the present invention produces narrower and more precisely positioned grooves and cuts on minute workpieces by precisely aligning the wire with the direction of wire movement, exactly positioning the wire on the workpiece, and improving the machining initiation. Appropriately selected wire contact pressure is used to produce smoother groove walls and prolong wire life. Using some of these same techniques, the wire can be repositioned on the workpiece one or more times to produce a pattern of grooves on the workpiece. Using wire of different sizes and shapes increases the number of pattern possibilities.

By viewing the work area while the wire is in reciprocating motion, the operator can see if the wire axis is not parallel to the direction of the motion. When the wire axis is not parallel, the wire appears to move from side to side in a direction transverse to the direction of motion. By adjusting the apparatus, the operator aligns the wire to be more parallel to the direction of motion and then again observes the wire for apparent transverse motion. The operator repeats these steps until the wire exhibits no transverse motion. At this point, the wire axis is parallel with the direction of reciprocating motion. Cutting wires aligned in this manner machine more narrow grooves on a workpiece because an aligned wire stays within tighter laterally tolerances on a workpiece than an unaligned wire.

Being able to observe the workpiece together with the wire in the work area while positioning the wire and while initiating the machining improves the operator's ability to accurately position the groove on the workpiece surface. Not only can the operator see the precise location of the wire on the workpiece as machining starts but the operator can also see if the wire has moved off of its intended position. If the wire slides, the operator can take corrective action by decreasing the wire pressure on the workpiece, repositioning the wire, and reapplying a lighter pressure. The wire is monitored and repositioned until a contact pressure is determined which permits the wire to machine the workpiece surface without slipping. The wire will continue to machine the surface at this pressure until a groove deep enough to "seat" the wire is machined in the workpiece surface. After the wire is seated, wire contact pressure can be increased to decrease the machining time.

After a groove is machined to the proper depth, the wire and workpiece separate. At this point, the wire may be repositioned to a different location on the workpiece to machine the next groove the same way. In this manner, two or more grooves can be machined on a workpiece to develop a groove pattern or footprint.

DETAILED DESCRIPTION OF THE INVENTION

Figure 1:
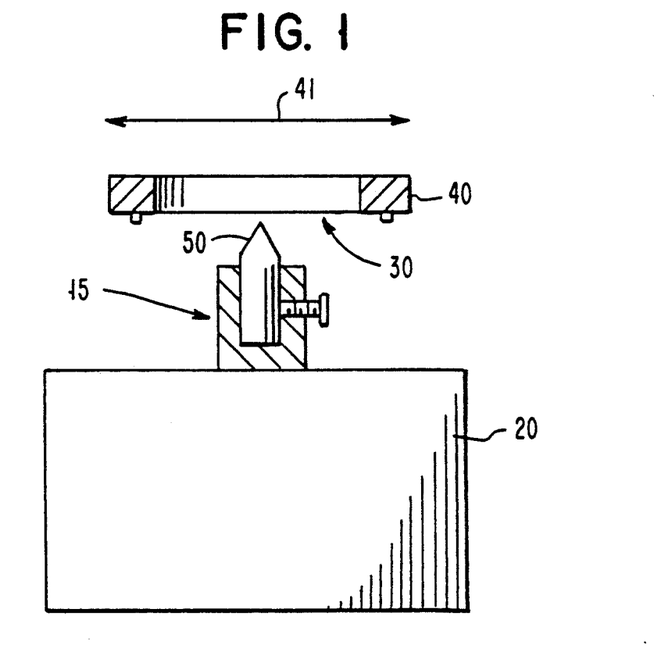
FIG. 1 shows an elevation view of a wire holding assembly, wire, workpiece, workpiece holder, and positioner stage.

The invention, as shown in FIG. 1 in elevation, comprises a workpiece holder 15, a positioner stage 20, a cutting wire 30, and a wire holding assembly 40. The workpiece holder 15 holds the workpiece 50 and is attached on the positioner stage 20. A drive apparatus, not shown in FIG. 1, reciprocally moves the wire holding assembly 40 in a direction illustrated by the double headed arrow 41. The wire holding assembly 40 aligns the wire axis in the direction of reciprocal motion 41. (Note that despite its name, the wire holding assembly 40 has components, described below, which both hold and align the wire.) The positioner stage 20, in combination with the workpiece holder 15, positions the workpiece 50 in proximity to the moving wire 30.

Figure 2:
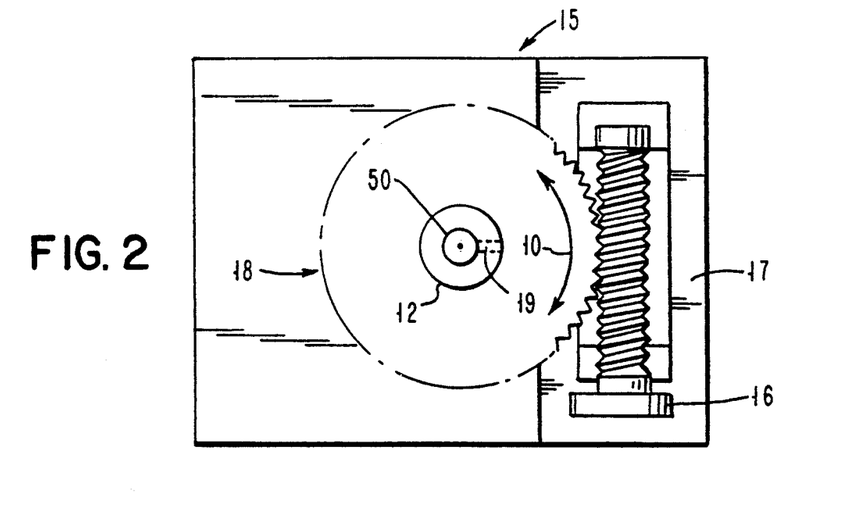
FIG. 2 shows a top view of the workpiece holder of the preferred embodiment.
Figure 3:
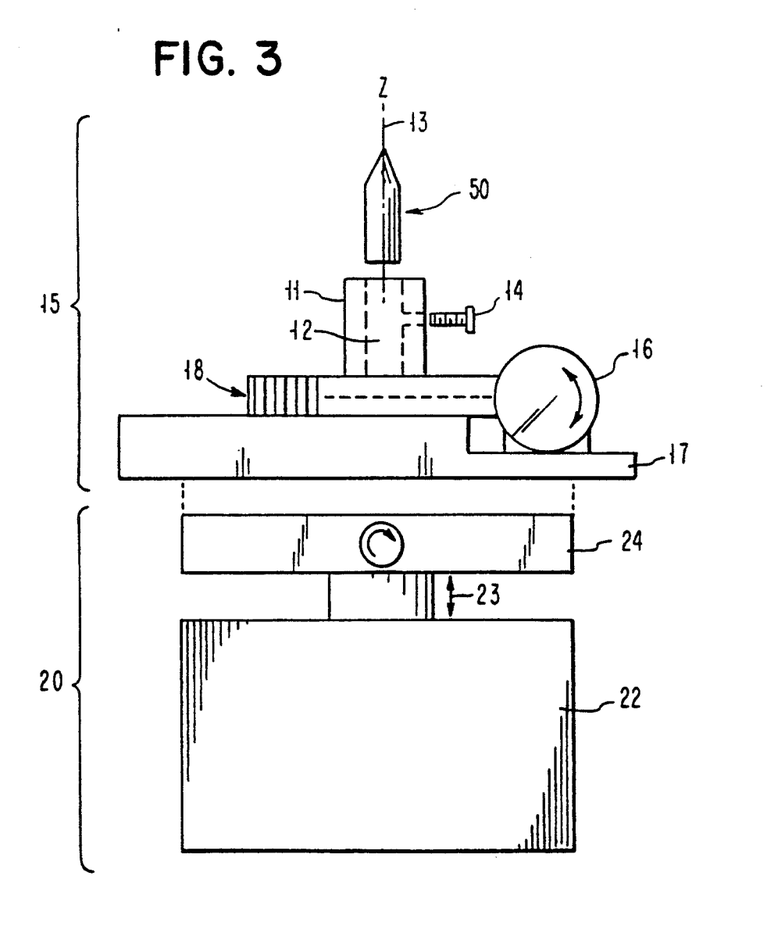
FIG. 3 shows an elevation of the workpiece holder and positioner stage of the preferred embodiment.

The workpiece holder 15 top view shown in FIG. 2 and elevation shown in FIG. 3 comprises a machined metal block 11 with a bored hole 12 into which the workpiece (tip) 50 is inserted. A set screw 14, disposed in a thread hole 19 perpendicular to bored hole 12, maintains the tip in position, i.e., the axis 13 of the tip 50 is colinear with the axis 13 of the bored hole 12. A worm gear mechanism 16 engages a holder gear 18 to rotate (direction of double arrow 10) the workpiece holder about the workpiece axis 13 with respect to a workpiece holder base 17. In the preferred embodiment, the machined block 11, holder gear 18, and holder base 17 are designed to keep the tip axis 13 perpendicular to the wire axis. These holders and rotation mechanisms are well known.

FIG. 3 shows the elevation table 22 and slide positioner 24 that make up the positioner stage 20. In the preferred embodiment, the elevation table 22 moves the workpiece toward or away from the wire in a direction 23 perpendicular to the wire axis, i.e., in the Z direction. In FIG. 3, the Z direction is colinear with the workpiece and bored hole axes 13. The slide positioner 24 moves the workpiece in a direction perpendicular to the Z direction, i.e., in a plane parallel to the wire. The stage used in the preferred embodiment combined a Unislide screw motion elevation table and slide positioner assembly. Any commercially available precision stage would perform adequately.

Figure 4:
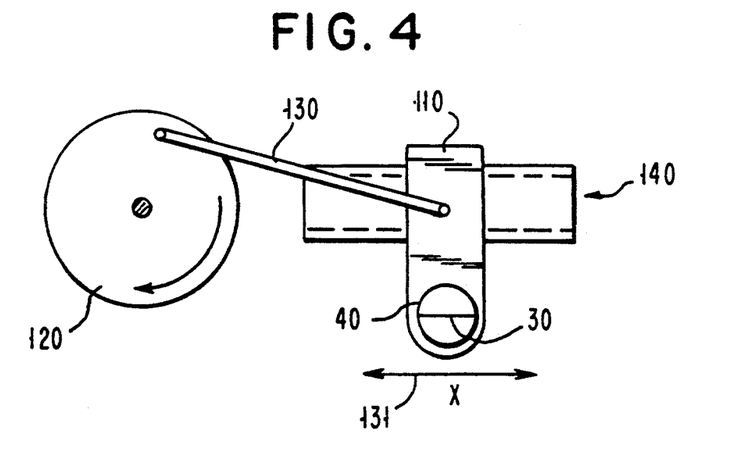
FIG. 4 shows a top view of the wire and wire holding assembly mounted in a drive means and in reciprocating motion.

In the preferred embodiment, to align the workpiece with the wire reciprocally moving in the X direction, arrow 131 in FIG. 4, the positioner stage translates in the Y and Z dimension. The workpiece holder also rotates in the Z direction to position the cutting wire with respect to the workpiece. In an alternative embodiment, the stage could further translate in the X direction and rotate in any of the three dimensions. Of course any relative movement of the wire holding assemble, holder, and/or stage to align the wire with the workpiece is within the contemplated scope of the invention.

The drive apparatus of the preferred embodiment, shown in FIG. 4, is a well known way to convert the rotational motion of a flywheel 120 into the linear reciprocating motion of an assembly platform 110. A motor driven (the motor is not shown) rotating flywheel 120 drives a linkage arm 130 which in turn drives an assembly platform 110. A bearing slide 140 restricts the assembly platform 110 to linear reciprocating motion in the direction of the double headed arrow 131, i.e. the X direction. The wire holding assembly 40, attached to the assembly platform 110, also moves in this direction. The frequency of motion is in the range between 0.1 cycle per second and 5 cycles per second.

The bearing slide 140, while allowing the assembly platform to reciprocally move in the X direction 131, maintains platform motion in other directions within tight tolerances. The bearing slide holds the assembly platform to within a 0.1 mil movement in the Y and Z directions. These tolerances maintain the assembly platform and cutting wire in constant orientation with respect to the workpiece after the wire axis is aligned in the direction of motion and the wire is positioned over the workpiece. The preferred embodiment uses a precision bearing slide 140 such as a Thompson 2DA dual rail linear bearing system. Any known means that would reciprocally move the wire holding assembly (wire) and workpiece with respect to each other in one dimension while maintaining required tolerances in the other two dimensions would allow practice of the invention.

Figure 5:
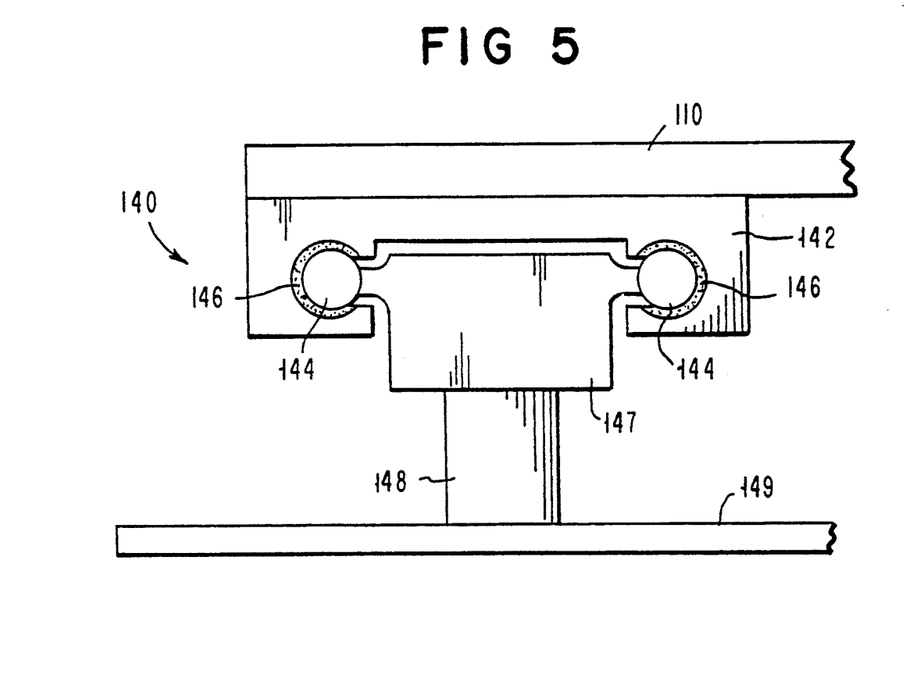
FIG. 5 shows an end view of a precision bearing slide assembly of the drive means illustrated in FIG. 4.

FIG. 5, the end view of the precision bearing slide 140, shows the bearing slide 140 attached to the assembly platform 110. This slide comprises a slider bearing housing 142 encompassing two slider guide rods 144. Bearing on the slider bearings 146 between the guide rods 144 and housing 142, the slider guide rods 144 are attached to the slider guide holder 147 which in turn is attached to a post 148 and base plate 149. The base plate 149, post 148 and slider guide holder 147 act in combination to maintain the slider guide rods 144 in a fixed position as the slider bearing housing 142 reciprocally moves along the axes of the rods 144. The assembly platform 110, therefore, reciprocally moves in the same direction.

Figure 6:
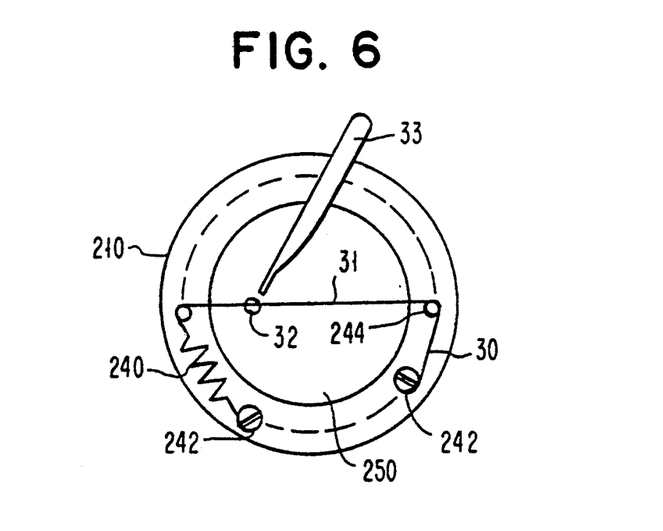
FIG. 6 shows a bottom view of the wire holding bushing in the preferred embodiment with an unobstructed view of work area.

FIG. 6 shows the bottom view of a wire holding bushing 210, a part of the preferred wire holding assembly 40 (shown in FIG. 1). The bushing 210 holds the wire 30 in a proper amount of tension across a work area 250, provides a working length 31 of wire (the amount of wire 30 within the work area 250) to contact the workpiece, and allows access to the wire for coating with an abrasive slurry 32 by some applicator means 33.

In the preferred embodiment, the wire is held in spring tension across the circular work area 250. To accomplish this, one end of the wire is fixed to the flat bottom of the wire holding bushing 210 with a screw 242 or other attaching means. The other end of the wire is attached to one end of a tension spring 240. The other end of the tension spring is attached to another part of the wire holding bushing with a screw 242. The wire wraps around one guiding post 244 on either side of the work area 250 so that the wire is held across a cord or diameter of the bushing 210. The preferred embodiment uses a diameter of the bushing because it gives the wire the maximum working length 31, i.e., the wire length that can come in contact with the workpiece.

The tension spring 240 allows some light pressure to be put on the wire in a direction transverse to the wire axis. The spring keeps the wire taut without causing the wire to break. The spring constant selected for tension spring 240 depends on the strength and diameter of the cutting wire but typically is strong enough to place the wire in tension without causing it to break during machining. A helical spring or any other commercially available type of spring will function adequately.

There are many ways within the scope of the invention to configure an apparatus holding a cutting wire in spring tension across a work area. The wire and spring also can be attached in a number of ways, e.g., spot welding to the assembly and twisting or looping the spring and wire together. Non-circular assemblies, such as C shaped apparatus, also permit alignment of a cutting wire across a work area.

Figure 7:
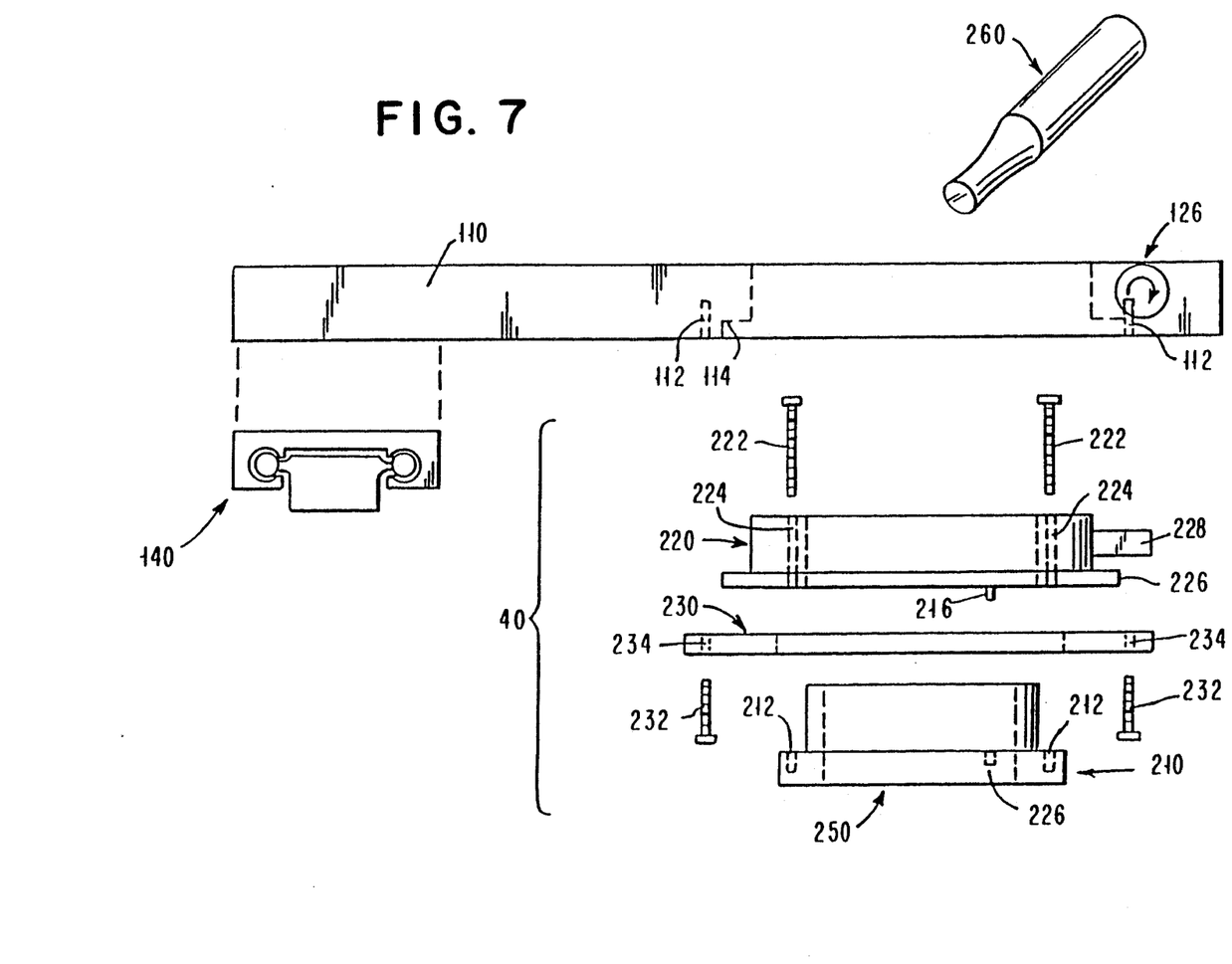
FIG. 7 shows an exploded side view of the wire holding assembly of the preferred embodiment attached to the assembly platform.

In the preferred embodiment, shown in FIG. 7, the assembled wire holding assembly 40 comprises several components. Although these components, the rotating ring 220 and retaining ring 230 are connected with and concentrically surround the wire holding bushing 210 in normal assembly, FIG. 7 shows an exploded side view the of wire holding assembly 40 for clarity. The figure also shows exploded views of the assembly platform 110 and the bearing slide 140. In the wire holding assembly 40, the wire holding bushing 210 fits concentrically within the rotating ring 220. A retaining ring 230 is sandwiched between the rotating ring 220 and wire holding bushing 210. Machine screws 222 pass through holes 224 in the rotating ring 220 and into treaded holes 212 in the wire holding bushing 210. The rotating ring 220 has a flange 226 which concentrically fits in a ledge 114 in the bottom of the assembly platform 110. Machine screws 232 pass through holes 234 in the retaining ring 230 and engage threaded holes 112 in the bottom of the assembly platform 110 to maintain the rotating ring 220 concentrically in the assembly platform 110. A microscope 260 is positioned above the work area 250 in a typical viewing position.

Figure 8:
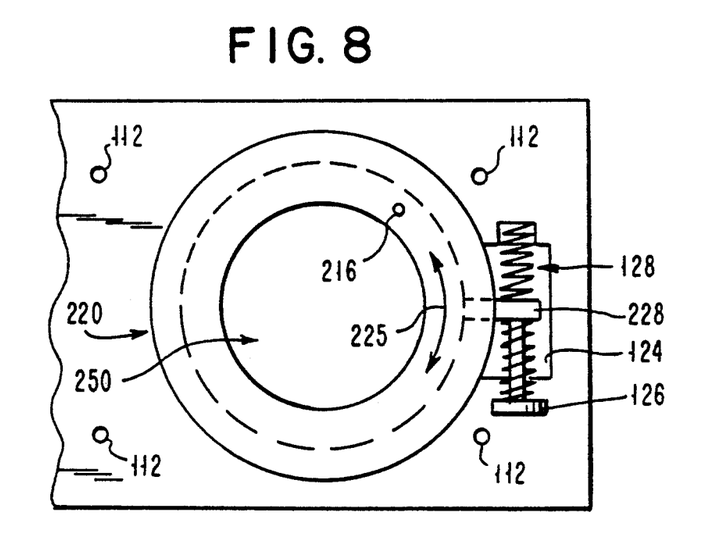
FIG. 8 shows a bottom view of the rotating ring mounted in the assembly platform.

FIG. 8 shows the preferred mechanism for rotating the rotating ring 220. A ring tab 228 radially protrudes from the rotating ring 220 and fits within a cavity 124 in the bottom of the assembly platform 110. A rotating screw 126, attached to the assembly platform 110, turns to push the ring tab 228 against a counter force exerted by a compression spring 128. The compression spring 128 removes hysteresis in the rotating ring rotation 225 and permits an accurate angular positioning of the rotating ring 220. This adjustment is used to place the axis of the wire 30 in exact alignment with the direction of wire reciprocating motion 131 (as shown in FIG. 4), thus assuring that the wire axis and the groove axis on the workpiece are exactly colinear at all times.

In the preferred embodiment, multiple wire holding bushings 210, like the one shown in FIGS. 6 and 7, can be prepared with spare wires or wires of different sizes and shapes. (Note that wires of different sizes and shapes machine grooves of different cross sections. See discussion of tips below.) These spare bushings easily replace the installed wire holding bushing 210 when a wire 30 needs replacement or when a groove of a different size or shape is required. A locating pin 216, projecting down from the rotating ring 220, engages a locating hole 226 in the wire holding bushing 210 to insure the wire holding bushing 210 engages and remains in the correct position with respect to the rotating ring 220.

The preferred embodiment, shown in FIG. 6, uses a tungsten cutting wire 30 coated with an abrasive paste or slurry 32. Normally, a small stiff wire or tooth pick 33 is used to manually apply a small amount of this coating 32 to the wire 30. After application, the coating 32 dries, leaving an abrasive powder stuck to the wire. Experience shows that the amount of the abrasive powder on the wire remains relatively constant during the back and forth motion of the wire on a workpiece. The coat material is a commercially available diamond polishing compound with a particle size smaller than one micron.

Although tungsten wires have been used for this purpose in the prior art, the present invention uses wires of much smaller dimensions (0.5 to 1.5 mil). The prior art wires were much stronger and produced larger grooves. The very fine wires used in the present invention are much more delicate and therefore more prone to breakage. The prior art of record does not address the problem of wire breakage.

Other variations of the coated cutting wire are within the scope of the invention. The slurry could be automatically applied to the wire using techniques known in the art. Instead of coating the wire, abrasive particles could impregnated the wire surface. Also, the material used for the wire could be softer than tungsten, e.g., stainless steel. During machining, abrasive particles in the slurry tend to embed in softer wires to enhance cutting.

Due to the simplicity of the present invention, an unobstructed view of the workpiece and wire is available from many perspectives during wire alignment and workpiece positioning. In the preferred embodiment, the work area is monitored through a microscope 260 looking past the wire on to the work piece. Because it uses complicated apparatus, the known prior art does not permit an unobstructed a view of the work area.

Any microscope known in the art with an appropriate magnification level is suitable for wire alignment and workpiece positioning. The preferred embodiment uses a general purpose Bausch and Lomb microscope with a magnification of approximately 70X.

The unobstructed view of the work area allows observation of the wire and workpiece during machining. Observation facilitates positioning, repositioning, and maintaining the cutting wire in a precise location with respect to some point on the workpiece. This is needed for tight tolerance cuts and groove pattern machining. Visually verification also helps determine the correct machining duration to achieve specific groove depths.

The method of the present invention comprises aligning the cutting wire, positioning and repositioning the wire with respect to the workpiece, and applying the correct amount of contact pressure between the wire and the workpiece to initiate and continue machining.

Aligning the wire axis with the direction of the reciprocating drive motion is called wire alignment. During alignment, the wire, positioned across a work area 250, is viewed in reciprocal motion. In the preferred embodiment the reciprocal wire motion is viewed in relation to the workpiece 50. If the wire axis is not in the same direction as the direction of wire motion 131, the wire will move from side to side transverse to the direction of reciprocal motion, i.e., wander. The wandering is more apparent when looking at the work area 250 over the wire 30 on to the workpiece 50. Turning the rotating screw 126 angularly displaces the wire 30 until the wire axis is aligned with the direction of motion 131. This observation and rotating screw 126 adjustment is repeated until the wire is aligned, i.e.,the wire stops its side to side motion.

Moving the workpiece in relation to the wire is called positioning. Positioning entails moving the positioning stage and workpiece holder to get the proper workpiece placement with respect to the wire. Positioning is also used to choose the exact groove placement and orientation on the workpiece. The workpiece can be repositioned repeatedly in order to machine a series of grooves thus forming a pattern of grooves on the workpiece.

The present apparatus can precisely position the wire in non-contact position with respect to a selected point on the workpiece. The stage 20, holder 15 (with workpiece 50), and/or wire holding assembly 40 move with respect to one another until the workpiece 50 is in correct proximity with the wire 30. Correct proximity means that the wire is in close, non-contact proximity with the workpiece and the wire axis is parallel to the axis of the groove to be machined. The wire is also positioned so that the axis of the wire and the axis of the groove are located in a plane which is between and parallel to the walls of the groove to be machined. In the preferred embodiment, with the wire 30 reciprocally moving in the X direction, the stage 20 moves in the Y and Z direction and the holder 15 rotates about the Z axis (arrow 10 in FIG. 2) to accomplish this positioning. In an alternative embodiment, the stage 20 could rotate about the Y axis to create a groove of varying depth in the X direction. In this case, the wire axis is still parallel to the axis of the groove to be machined.

Once the workpiece surface location to be cut is correct proximity to the wire and the wire aligned, the stage displaces the workpiece toward the wire to place the wire 30 and workpiece 50 in a first contact pressure at a first contact position where the groove is to be machined. In the preferred embodiment, the workpiece is displaced along the Z axis 13 in FIG. 3. More generally, the wire and workpiece are moved together in the direction of the depth of the groove to be machined, i.e., parallel to the groove walls.

If this movement puts too much pressure on the wire from the workpiece, the wire could slide off the intended location of the cut. Wire sliding particularly happens on hard workpieces. To avoid wire sliding, initially the wire is placed only in very light pressure contact with the workpiece surface. This initiating light contact helps insure that the wire will start cutting the groove at a precise workpiece position. The amount of this initiating light pressure contact is great enough to initiate workpiece surface machining but light enough to avoid sliding.

Initiating light pressure contact is achieved by moving the wire 30 and workpiece 50 together to a first contact pressure and observing the wire to see if it slides. If the wire does not slide, that first contact pressure will be initiating light pressure. If the wire does slide, separate the workpiece and wire until the wire slides back to the correct location on the workpiece or until the wire can be again positioned to the correct location, i.e., the first contact position. Again move the wire and workpiece together at a subsequent contact pressure which is less than the previous (first) contact pressure. Observe again for wire sliding. If the wire does not slide this subsequent contact pressure is initiating light pressure. If the wire does slide, repeat the workpiece and wire separation, positioning, and application of another subsequent contact pressure until no sliding is observed. This final subsequent contact pressure is initiating light pressure.

After some exposure to initiating light pressure contact with the workpiece, the wire abrades an initial groove in the workpiece surface, i.e., the wire "seats" in the initial selected groove position. Wire seating prevents further wire sliding.

After wire seating, wire contact pressure on the workpiece can be increased to cutting light pressure. The preferred embodiment does this by moving the stage in the Z direction toward the wire. Because cutting light pressure is greater than initiating light pressure, it decreases the machining time. However, cutting light pressure is light enough to result in a smoothly machined groove and an acceptable mean time between wire failure.

The present invention machines much smoother surfaces than the prior art. This is due to the more gradual abrasion cutting of the workpiece caused by light pressure contact with the wire. Holding the wire in light pressure contact with the workpiece increases the number of cycles required to make a depth of cut and results in a smoothly machined surface. Although the reason for this is not entirely understood, we suspect that the increased number of cycles required to perform the depth of cut also cause a polishing action on the groove surface. Gradual accumulation of less abrasive wear particles from the workpiece may also contribute to the polishing.

Light pressure contact machining and placing the wire in spring tension permits the present invention to prolong the life of cutting wires. These cutting wires are finer than those in the known prior art. Less wire breakage is particularly important in micromachining operations because the fine dimensioned wires have reduced strength. The tension spring reduces wire breakage by not only maintaining tension on the wire but also reducing the total wire tension and impulse shock in the wire during machining.

Figure 9:
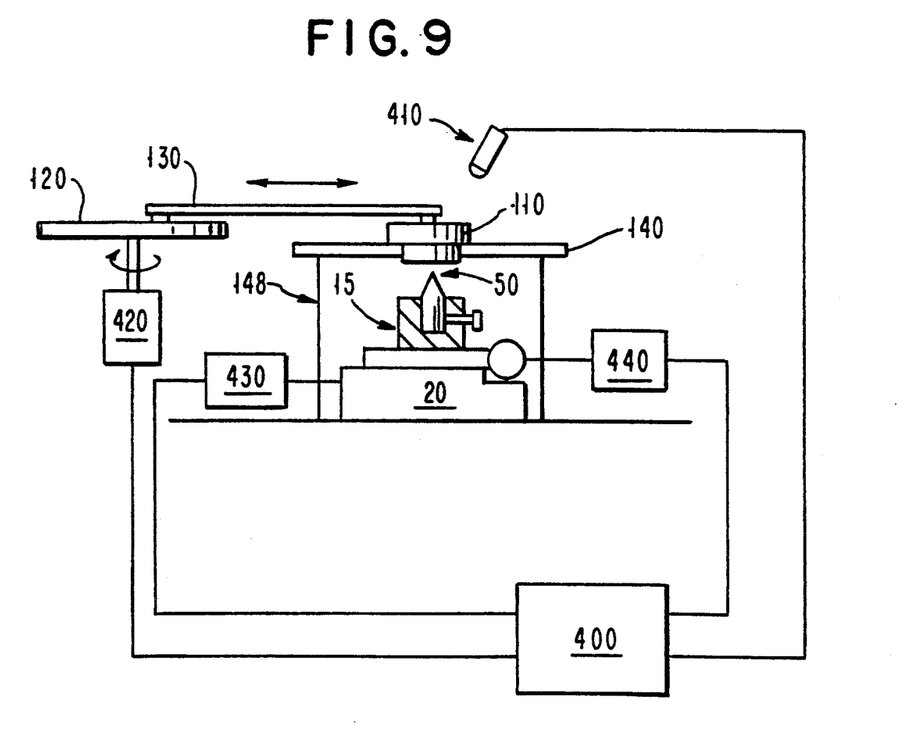
FIG. 9 shows a computer controlling the alignment and machining operations of the apparatus.

Using known technology, one skilled in the art could use a computer to drive the various apparatus adjustments and monitor the wire alignment and workpiece positioning. Such a computer could be used to align the workpiece and wire, initiate workpiece machining, and stop machining when the appropriate groove or cut is completed. See FIG. 9. For example, a computer 400 receives signals from position sensors 410 and adjusts drive controllers to control reciprocating frequency 420, positioner stage position 430, and workpiece holder angular position 440 in a way conforming with the present positioning, wire alignment, and pressure adjusting steps.

The preferred embodiment, as detailed above, is used to machine single point bonding (SPB) tips and wire bonding tips. These tips bond one point at a time very accurately and efficiently. Because single point bonding performs only one bond at a time, these tips must perform hundreds of thousands or even millions of operations in their lifetime. The present invention can produce SPB tips that can last for 1,000 to 10,000 times the number of operations performed by tips produced by the prior art.

There is normally a particular footprint, or grooved pattern, machined on the SPB tip end to perform a particular function. The precision and quality control of the footprint is critical to achieve high yields in bonding. Several examples are provided below.

Solderless bonding of fine-lead TAB components to pads disposed on an epoxy printed circuit board is disclosed in Chalco, U.S. Pat. No. 4,970,365. This patent is incorporated by reference.

In a soldering operation, a larger groove might be machined in the tip footprint to hold the wire to be soldered while other smaller grooves will be cut in the larger groove sides to allow space for solder flow. These side grooves will also act as molds to form the solder in a "fillet" on the sides of the wire.

In an operation called diffusion bonding, a different tip footprint is used. In this case, a delicate wire is held in one groove while it is heated and pressed on to a substrate. The wire attaches to the substrate by diffusion bonding. Although the wire does not melt (and there is no soldering involved), the metal softens and begins to flow under the pressure. Another smaller groove is cut within the first wire holding groove to allow space where the softened wire can flow to form a different shape. Shaping the wire properly insures a high bond strength without weakening the wire.

Fixing a broken line on a substrate requires another type of tip footprint. In this application, a 1 mil by 0.5 mil rectangular cross-sectional wire is typically used to bridge the disconnection. To diffusion bond this wire, the tip footprint must have a very shallow groove to hold the wire. If the groove is too deep, the wire will sink too deeply into the groove and won't come into contact with the substrate when heat and pressure is applied.

In another application, connecting two wires at a cross over, the tip footprint would require two grooves crossing one another at a specific angle.

These tip footprint examples and their applications, presented here to illustrate applications of this invention, are not exhaustive and not meant to limit the scope of the invention. There are many other applications, though not mentioned here, which could use the micromachined footprints of the present invention.

The fine capillary tips used in laser heated ultrasonic bonding are typically made of a hard, heat resistant tungsten-tungsten-carbide alloy. Although the ends of these tips may have dimensions on the order of 2 to 10 mils, grooves must be machined on these tip ends. No known prior art is capable of this machining. Wires down to dimensions of 0.1 mil or less could be used to cut grooves in workpieces using this method pending wire availability.

By cutting different types of grooves at exactly specified locations on the workpiece, the groove pattern or "footprint" machined into the workpiece surface can be varied. Changing the diameter of the cutting wire will change the width of the grooves. Grooves in a workpiece can be shallow or deep or even cut through the workpiece. (Groove depth is controlled by a number of factors including length of cut time, Z direction pressure, and the wire reciprocating frequency. Groove depth can be accurately controlled by visually monitoring the depth of groove cut while the wire machines the groove.) Grooves with smaller diameters can be machined at the bottom or in the side walls of larger grooves by placing a smaller diameter cutting wire inside a larger groove and moving the stage to cut the groove bottom or sides. Grooves may be machined parallel to one another or may cross at an angle. Cutting wire with different cross sections, e.g., circular, square, rectangular, or triangular would produce different shaped grooves. Although not specifically disclosed, footprints machined by this method using combinations of these different groove types are within the scope of the present invention.

Having the axis of the wire perpendicular to the Z direction stage movement will insure that the groove has uniform depth throughout the cut. Workpiece holder machining and stage attachment using methods known in the art will insure perpendicularity. To machine a groove which progressively changes in depth, an alternative embodiment would tilt the stage so that the Z direction is not perpendicular to the wire axis.

Other variations within the scope of the invention are possible by changing the surface of the workpiece. Rather than being flat, the workpiece surface could be another shape, e.g., conical or spherical. The workpiece might have holes in it. The present method can easily accommodate these workpiece variations.

What is claimed is:

1. A method of aligning a cutting wire with cross sectional dimensions smaller than 2 mils comprising the steps of:
   a. holding the wire across a work area;
   b. reciprocally moving the wire;
   c. observing any apparent wire motion transverse to the direction of reciprocal motion;
   d. aligning the wire axis to be parallel with the direction of reciprocal motion;
   e. repeating steps c and d until there is no observable apparent wire motion transverse to the direction of reciprocal motion.

2. A method of aligning as in claim 1 wherein the wire motion is observed with respect to the workpiece which is positioned below the cutting wire.

3. A method of machining a groove on a minute workpiece with a reciprocally moving cutting wire comprising the steps of:
   a. placing the workpiece and a reciprocating cutting wire in proximity so that the axis of the wire is parallel to the axis of the groove to be machined in the workpiece;
   b. moving the workpiece and wire together until the workpiece experiences a first contact pressure with the cutting wire at a first contact position where the groove is to be machined on the workpiece;
   c. observing the cutting wire to see if the wire slides to a position different from the first contact position;
   d. if the wire slides, reducing wire pressure on the workpiece by moving the wire and workpiece apart;
   e. returning the wire axis location to the first contact position;
   f. moving the workpiece and wire together again until the workpiece experiences a subsequent first contact pressure with the cutting wire less than the previous first contact pressure;
   g. repeating steps c through f until reaching an initiating light pressure contact between the wire and the workpiece at which the wire no longer slides on the workpiece;

h. maintaining the initiating light pressure contact between the wire and workpiece until the wire machines a groove seat in the workpiece surface.

4. A method as in claim 3 performed while maintaining the cutting wire in tension.

5. A method as in claim 3 wherein the pressure between the wire and workpiece is increased to a cutting light pressure after wire seating.

6. A method as in claim 5 maintaining cutting light pressure until the wire cuts to the desired depth in the workpiece.

7. A method as in claim 6 wherein the wire cuts through the entire workpiece.

8. A method of micromachining a groove in a minute workpiece using a cutting wire with cross sectional dimensions smaller than 2 mils comprising the steps of:
1. Aligning the cutting wire by:
   a. holding the wire across a work area;
   b. reciprocally moving the wire;
   c. observing any apparent wire motion transverse to the direction of reciprocal motion;
   d. aligning the wire axis to be parallel with the direction of reciprocal motion;
   e. repeating steps c and d until there is no observable apparent wire motion transverse to the direction of reciprocal motion.
2. Initiating machining on the minute workpiece by:
   a. placing the workpiece and cutting wire in proximity so that the axis of the wire is parallel to the axis of the groove to be machined in the workpiece;
   b. maintaining the wire in tension;
   c. moving the workpiece and wire together in the direction of the depth of the groove to be machined until the workpiece experiences a first contact pressure with the cutting wire at a first contact position;
   d. observing the cutting wire to see if the wire slides to a position different from the first contact position;
   e. if the wire slides, reducing wire pressure on the workpiece by moving the wire and workpiece apart;
   f. returning the wire axis location to the first contact position;
   g. moving the workpiece and wire together again until the workpiece experiences a subsequent first contact pressure with the cutting wire less than the previous first contact pressure;
   h. repeating steps d through g until reaching an initiating light pressure contact between the wire and the workpiece at which the wire no longer slides on the workpiece;
   i. maintaining the initiating light pressure contact between the wire and workpiece until the wire machines a groove seat in the workpiece surface.

9. A method for micromachining minute workpieces as in claim 8 wherein the pressure between the cutting wire and the workpiece is increased to a cutting light pressure after the wire machines a groove seat in the workpiece surface.

10. A method as in claim 8 wherein the cutting wire axis is aligned with the direction of reciprocal motion by angularly moving the wire around a circular work area.

11. A method as in claim 8 wherein the workpiece and wire are moved together and apart by moving a positioning stage to which the workpiece is attached.

12. A method as in claim 8 wherein the wire alignment and cut initiating are observed with a microscope.

13. A method as in claim 9 wherein the cutting light pressure is adjusted to affect the smoothness of groove walls in the surface of the workpiece.

14. A method for repositioning the cutting wire to a different location on the workpiece surface to machine a subsequent groove comprising the steps of:
   a. separating the wire and workpiece at a first cutting position on the workpiece surface;
   b. moving the cutting wire and workpiece relative to each other;
   c. observing the relative wire and workpiece movement in the work area while accurately positioning the wire in close proximity to the workpiece with the wire axis parallel to the axis of a second groove to be machined in the surface of the workpiece;
   d. moving the wire and the workpiece together in the direction of the depth of the second groove to be machined in the workpiece until there is first contact pressure between the wire and workpiece at a second contact position;
   e. observing the cutting wire to see if the wire slides to a position different from the second contact position;
   f. if the wire slides, reducing wire pressure on the workpiece by moving the wire and workpiece apart;
   g. returning the wire axis location to the second contact position;
   h. moving the workpiece and wire together again until the workpiece experiences a subsequent first contact pressure with the cutting wire less than the previous first contact pressure;
   i. repeating steps e through h until reaching an initiating light pressure contact between the wire and the workpiece, i.e., a subsequent first contact pressure at which the wire no longer slides on the workpiece;
   j. maintaining the initiating light pressure contact between the wire and workpiece until the wire machines a groove seat in the workpiece surface at the second contact position.

15. A method as in claim 14 wherein the pressure between the wire and workpiece is increased to a cutting light pressure after the wire seats in the groove.

16. A method as in claim 15 wherein the steps of the claim are repeated to machine a pattern on a minute workpiece.

17. A method as in claim 15 wherein the wire is maintained in spring tension.

18. A method of micromachining a groove in a workpiece comprising the steps of:
   holding a cutting wire under tension with a working length of the wire across a work area in a wire holding assembly;
   reciprocally moving the assembly and wire;
   holding the workpiece on a stage;
   aligning the stage so that the wire is in precise proximity to the workpiece;
   aligning the wire axis parallel to the direction of reciprocal motion;
   moving the stage to place the workpiece in a light pressure contact with the reciprocating wire;

maintaining light pressure contact until a groove seat of specified depth is cut into the workpiece surface.

19. A method as in claim 18 wherein, after the groove seat is cut, the stage is adjusted to increase the wire contact pressure to a cutting light pressure on the workpiece.

20. A method as in claim 18 where the light pressure contact is adjusted to effect groove wall smoothness.

21. A method as in claim 19 where the cutting light pressure contact is adjusted to effect the groove wall smoothness.

* * * * *